US011854306B1

(12) United States Patent
Sima et al.

(10) Patent No.: US 11,854,306 B1
(45) Date of Patent: Dec. 26, 2023

(54) FITNESS ACTION RECOGNITION MODEL, METHOD OF TRAINING MODEL, AND METHOD OF RECOGNIZING FITNESS ACTION

(71) Applicant: Nanjing Silicon Intelligence Technology Co., Ltd., Jiangsu (CN)

(72) Inventors: Huapeng Sima, Jiangsu (CN); Hao Jiang, Jiangsu (CN); Hongwei Fan, Jiangsu (CN); Qixun Qu, Jiangsu (CN); Jintai Luan, Jiangsu (CN); Jiabin Li, Jiangsu (CN)

(73) Assignee: Nanjing Silicon Intelligence Technology Co., Ltd., Nanjing (CN)

( * ) Notice: Subject to any disclaimer, the term of this patent is extended or adjusted under 35 U.S.C. 154(b) by 0 days.

(21) Appl. No.: 18/343,334

(22) Filed: Jun. 28, 2023

(30) Foreign Application Priority Data

Oct. 8, 2022 (CN) .......................... 202211219816.4

(51) Int. Cl.
*G06V 40/20* (2022.01)
*G06V 10/77* (2022.01)
*G06V 10/764* (2022.01)

(52) U.S. Cl.
CPC ............ *G06V 40/23* (2022.01); *G06V 10/764* (2022.01); *G06V 10/7715* (2022.01); *G06V 2201/12* (2022.01)

(58) Field of Classification Search
CPC .. G06V 40/23; G06V 10/7715; G06V 10/764; G06V 2201/12
See application file for complete search history.

(56) References Cited

U.S. PATENT DOCUMENTS

2012/0239174 A1* 9/2012 Shotton ................ G06V 40/10
382/218
2021/0319213 A1 10/2021 Meng et al.
2022/0198834 A1* 6/2022 Fujimoto ............... G06V 20/64

FOREIGN PATENT DOCUMENTS

CN 111753747 A 10/2020
CN 112287866 A 1/2021
CN 115019386 A 9/2022

OTHER PUBLICATIONS

Notification of the First Office Action for Chinese counterpart application 202211219816.4, dated Nov. 22, 2022 (English translation).

(Continued)

*Primary Examiner* — David F Dunphy
(74) *Attorney, Agent, or Firm* — K&L Gate LLP

(57) ABSTRACT

A model including an information extraction layer that obtains image information of a training object in a depth image; a pixel point positioning layer that performs position estimation on a three-dimensional coordinate of human-body key points, defines a body part of the training object as a body component, and calibrates a three-dimensional coordinate of all human-body key points corresponding to the body component; a feature extraction layer that extracts a key-point position feature, a body moving speed feature, and a key-point moving speed feature for action recognition; a vector dimensionality reduction layer that combines the key-point position feature, the body moving speed feature, and the key-point moving speed feature as a multidimensional feature vector, and performs dimensionality reduction on the multidimensional feature vector; and a feature vector classification layer that classifies the multidimensional feature vector that is performed with dimensionality reduction, to recognize a fitness action of the training object.

9 Claims, 4 Drawing Sheets

(56) References Cited

OTHER PUBLICATIONS

Notification on Grant of Patent Right for Invention for Chinese counterpart application 202211219816.4, dated Dec. 8, 2022 (English translation).

\* cited by examiner

FITNESS ACTION RECOGNITION MODEL, METHOD OF TRAINING MODEL, AND METHOD OF RECOGNIZING FITNESS ACTION

CROSS-REFERENCE TO RELATED APPLICATIONS

The present application claims priority to Chinese patent application number 202211219816.4 filed on Oct. 8, 2022, which is incorporated herein by reference in its entirety as set forth in full.

FIELD OF THE INVENTION

This application relates to the field of intelligent fitness technologies, and in particular, to a fitness action recognition model, a method of training a model, and a method of recognizing fitness action.

BACKGROUND OF THE INVENTION

With popularization of fitness in concepts of people, more people are consciously engaging in fitness activities. Conventional fitness manners often require users to go to a gym and follow a coach for exercise, or to train through a relevant application in an intelligent terminal according to a video tutorial provided in the application. In the foregoing fitness manners, it will consume a large amount of time and money of the users to exercise in the gym. However, for training by using the intelligent terminal, training is performed merely based on content of the video, making it difficult for the user to determine whether an action thereof is correct. To this end, some manufacturers provide computer vision-based fitness manners. To be specific, a camera of the intelligent terminal is used to retrieve and recognize a user action, to correct the user action in time.

In related technologies, there are many problems in schemes of recognizing the user action and assisting the user in exercising. For example, accuracy of action recognition is greatly affected by a use scenario. When a training object is in a color similar to that of a background, or when there are other viewers next to the training object, inaccurate recognition of a key node of the training object in a key frame may occur, resulting in a large calculation error in a capability value of the training object. For some training actions, a trainer is required to turn a side body towards a screen, which makes it difficult for the trainer to watch a standard action for reference during the training. When collecting information about an exercise image of the trainer, information about a training scene of the trainer may also be collected. In this case, the trainer has a series of problems such as a risk of privacy leakage.

Regarding the problem of inaccurate evaluation of the capability value of the training object in the related technologies, which affects an effect of action correction of the user during a fitness process of the user, no effective solution has been proposed in the related technologies.

SUMMARY OF THE INVENTION

Embodiments of this application provide a fitness action recognition model, a method of training a model, and a method of recognizing fitness action, to resolve at least a technical problem of inaccurate evaluation of a capability value of a training object in the related technologies, which affects an effect of action correction of a user during a fitness process of the user.

In an embodiment of this application, a fitness action recognition model is provided, including an information extraction layer, a pixel point positioning layer, a feature extraction layer, a vector dimensionality reduction layer, and a feature vector classification layer. The information extraction layer is configured to obtain image information of a training object in a depth image, the image information including a three-dimensional coordinate of human-body key points corresponding to all pixel points in the depth image. The pixel point positioning layer is configured to perform position estimation on the three-dimensional coordinate of the human-body key points by using a random decision forest, define a body part of the training object as a corresponding body component, and calibrate a three-dimensional coordinate of all human-body key points corresponding to the body component. The feature extraction layer is configured to extract, based on the three-dimensional coordinate of all the human-body key points, a key-point position feature, a body moving speed feature, and a key-point moving speed feature for action recognition. The vector dimensionality reduction layer is configured to combine the key-point position feature, the body moving speed feature, and the key-point moving speed feature as a multidimensional feature vector, and perform dimensionality reduction on the multidimensional feature vector. The feature vector classification layer is configured to classify the multidimensional feature vector that is performed with dimensionality reduction, to recognize a fitness action of the training object.

In an embodiment of this application, a method of training a fitness action recognition model is further provided, which is applicable to the foregoing model, includes: collecting a motion process video of a training object by using a three-dimensional visual sensor, and extracting a plurality of consecutive frames of depth images that contain the training object based on a motion video; and inputting the plurality of consecutive frames of depth images to a fitness action recognition model to be trained. The fitness action recognition model to be trained performs the following steps based on an initial model parameter: obtaining image information of the training object in the depth image, the image information including a three-dimensional coordinate of human-body key points corresponding to all pixel points in the depth image; performing position estimation on the three-dimensional coordinate of the human-body key points by using a random decision forest; defining a body part of the training object as a corresponding body component, and calibrating a three-dimensional coordinate of all human-body key points corresponding to the body component; extracting, based on the three-dimensional coordinate of all the human-body key points, a key-point position feature, a body moving speed feature, and a key-point moving speed feature for action recognition; combining the key-point position feature, the body moving speed feature, and the key-point moving speed feature as a multidimensional feature vector, and performing dimensionality reduction on the multidimensional feature vector; and classifying the multidimensional feature vector that is performed with dimensionality reduction to recognize a fitness action of the training object, optimizing the initial model parameter based on the recognized fitness action, and completing training until a model conversion condition is reached to obtain a target fitness action recognition model.

In an embodiment of this application, the performing position estimation on the three-dimensional coordinate of the human-body key points by using a random decision forest includes: defining the body part of the training object by a plurality of different body labels, wherein the body labels include an estimation label which is used to directly estimate a three-dimensional coordinate of a particular human-body key point of the training object in the depth image and a filling label which is used to fill a blank area of the body of the training object in the depth image or predict a three-dimensional coordinate of human-body key points of another key points of the training object; extracting a depth-image feature from the depth image, and combining the depth-image feature with the random decision forest to distinguish between all body labels that are calibrated as trained; and performing position estimation on the three-dimensional coordinate of all the human-body key points of the training object in the depth image through the distinguished body labels.

In an embodiment of this application, the performing position estimation on the three-dimensional coordinate of the human-body key points by using a random decision forest further includes: obtaining a position estimation probability value of the three-dimensional coordinate of the human-body key points based on a probability density estimator of each of the body labels, and performing position estimation on the three-dimensional coordinate of the human-body key points based on the position estimation probability value; and obtaining a pixel weight based on the position estimation probability value, to obtain a three-dimensional coordinate of human-body key points corresponding to each of the body labels.

In an embodiment of this application, the random decision forest includes a plurality of random decision trees, and each of the random decision trees is obtained by being trained as the following steps: obtaining a group of random branch-node candidate values of the decision tree; dividing a sample set into a left subset and a right subset through the branch-node candidate value of the decision tree; and obtaining a maximum gain of the sample set, where when a depth of the decision tree does not reach a preset value through the maximum gain, recursion is continued in the left subset and the right subset until the depth of the decision tree reaches the preset value, to complete the training.

In an embodiment of this application, before calibrating a three-dimensional coordinate of all human-body key points corresponding to the corresponding body component of the training object, the method further includes: determining a frame, in which no human-body key point is detected, as an invalid frame and discarding the invalid frame, when detecting the plurality of consecutive frames of depth images.

In an embodiment of this application, before calibrating a three-dimensional coordinate of all human-body key points corresponding to the corresponding body component of the training object, the method further includes: discarding a frame in which not all human-body key points are calibrated and missed human-body key points exceed a set threshold, when detecting the plurality of consecutive frames of depth images; and confirming the missed human-body key point based on a relative position of the body component corresponding to the missed human-body key point in a previous frame of the frame to a neck of the training object when the missed human-body key points in the frame do not exceed the set threshold, and supplementing all missed human-body key points in the frame.

In an embodiment of this application, schemes for the classifying the multidimensional feature vector that is performed with dimensionality reduction include a K-nearest neighbor algorithm, a support vector machine, a depth neural network, and a random forest.

In an embodiment of this application, a method of recognizing fitness action is further provided, including: collecting a fitness video of a target object by using a depth image sensor;
    transferring the collected fitness video into a trained fitness action recognition model obtained by being trained using the foregoing training method; and
    recognizing a fitness action of the target object by using the trained fitness action recognition model.

It can be learned from the foregoing technical solutions that based on the fitness action recognition model provided in this application, a fitness process of the training object is collected by using a depth camera, an image feature is extracted by using a three-dimensional image as input, and the fitness action is recognized through feature classification. In this way, accuracy of calibrating the human-body key point is improved, and meanwhile, a risk of personal privacy leakage for a trainer is eliminated.

BRIEF DESCRIPTION OF THE DRAWINGS

The accompanying drawings described herein are used to provide further understanding of this application, and constitute a part of this application. The exemplary embodiments and descriptions of this application are used to explain this application, and do not constitute an improper limitation to this application. In the accompanying drawings.

DETAILED DESCRIPTION OF THE EMBODIMENTS

This application is described below in detail with reference to the accompanying drawings and in combination with the embodiments. It should be noted that the embodiments in this application and the features in the embodiments can be combined with each other in the case of no conflict.

It should be noted that the terms "first", "second", and the like in this specification, the claims, and the accompanying drawings of this application are intended to distinguish between similar objects, but are not necessarily intended to describe a particular sequence or a sequential order.

Figure 1:
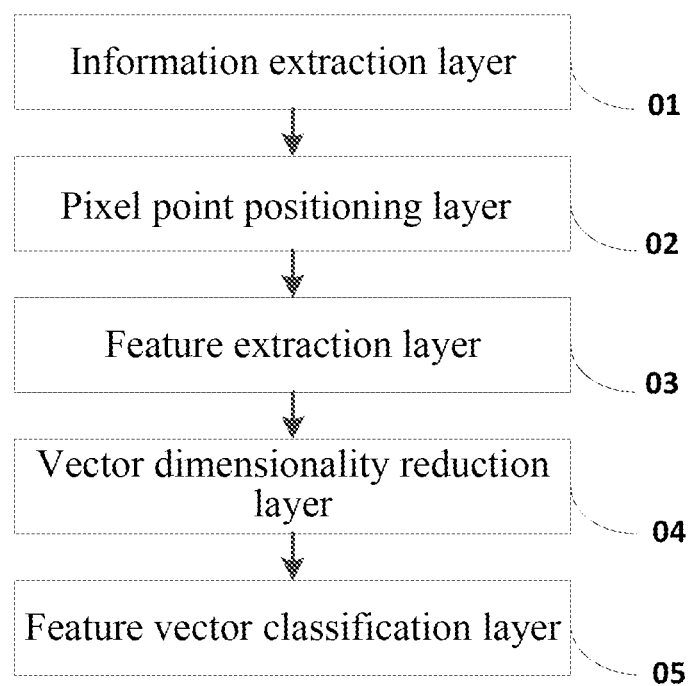
FIG. 1 is a schematic diagram of a structure of a fitness action recognition model according to this application.

As shown in FIG. 1, an embodiment of this application provides a fitness action recognition model, including an information extraction layer 01, a pixel point positioning layer 02, a feature extraction layer 03, a vector dimensionality reduction layer 04, and a feature vector classification layer 05.

The information extraction layer 01 is configured to obtain image information of a training object in a depth image. The image information includes a three-dimensional coordinate of human-body key points corresponding to all pixel points in the depth image. For example, a video about a motion process of the training object is collected by using a three-dimensional visual sensor, with the training object being 1 to 2 meters away from the three-dimensional visual sensor. Video resolution is preferably 480 P, but there is no mandatory requirement. Each pixel point of the image contains collected depth information, that is, a three-dimensional coordinate of an actual object corresponding to the pixel point in a camera coordinate system. A frame rate of the video is 10 frames per second.

The pixel point positioning layer 02 is configured to perform position estimation on the three-dimensional coordinate of the human-body key points by using a random decision forest, define a body part of the training object as a corresponding body component, and calibrate a three-dimensional coordinate of all human-body key points corresponding to the body component. To locate the human-body key point, a body part that is spatially close to the human-body key point that needs to be located is defined as a body component.

The feature extraction layer 03 is configured to extract, based on the three-dimensional coordinate of all the human-body key points, a key-point position feature, a body moving speed feature, and a key-point moving speed feature for action recognition.

The vector dimensionality reduction layer 04 is configured to combine the key-point position feature, the body moving speed feature, and the key-point moving speed feature as a multidimensional feature vector, and perform dimensionality reduction on the multidimensional feature vector.

The feature vector classification layer 05 is configured to classify the multidimensional feature vector that is performed with dimensionality reduction, to recognize a fitness action of the training object.

Figure 2:
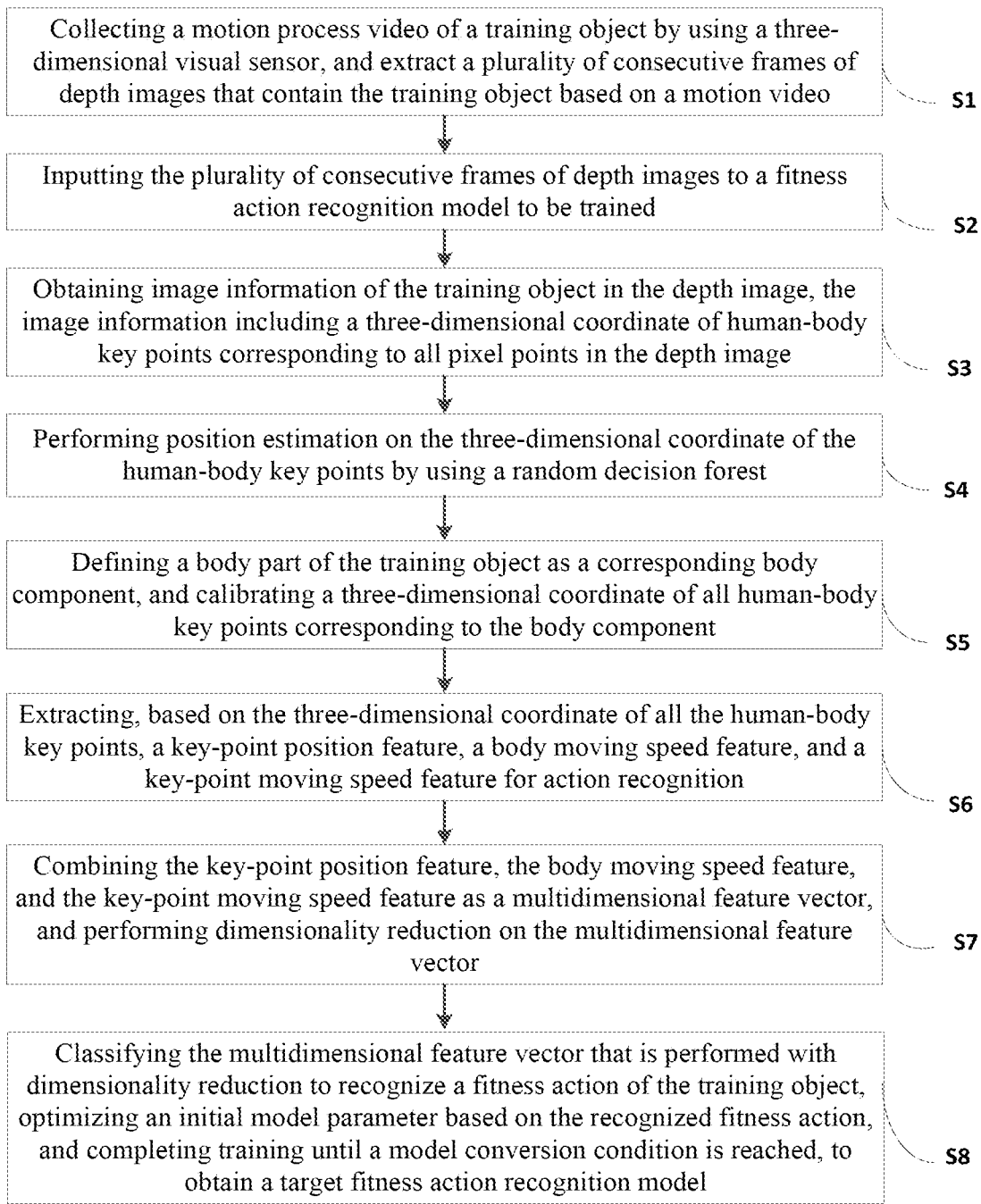
FIG. 2 is a schematic flowchart of a method of training a fitness action recognition model according to this application.

Referring to FIG. 2, an embodiment of this application further provides a method of training a fitness action recognition model, which is applicable to the foregoing model. The method includes the following steps.

S1. Collecting a motion process video of a training object by using a three-dimensional visual sensor, and extracting a plurality of consecutive frames of depth images that contain the training object based on a motion video.

In this application, the motion process video of the training object is collected by using the three-dimensional visual sensor, to extract a motion image. The training object is at a distance of 1-2 m from the three-dimensional visual sensor. Video resolution is preferably 480 p, but there is no mandatory requirement. Each pixel point of the image contains collected depth information, that is, a three-dimensional coordinate of an actual object corresponding to the pixel point in a camera coordinate system. A frame rate of the video is 10 frames per second.

S2. Inputting the plurality of consecutive frames of depth images to a fitness action recognition model to be trained, where the fitness action recognition model to be trained performs the following steps based on an initial model parameter.

S3. Obtaining image information of the training object in the depth image, the image information including a three-dimensional coordinate of human-body key points corresponding to all pixel points in the depth image.

For a pixel x on the depth image, feature calculation is performed according to the following equation (1):

$$f_\theta(I, x) d_I\left(x + \frac{u}{d_I(x)}\right) - d_I\left(x + \frac{v}{d_I(x)}\right). \quad (1)$$

$d_I$ represents a depth of an image I at the pixel x, and a parameter $\theta=(u,v)$ describes offsets u and v in a camera coordinate system. A normalized offset $$\frac{1}{d_I(x)}$$

is used to ensure depth invariance of the feature: For a given point on the body, feature calculation may give a fixed world space offset value. The offset value is irrelevant to a distance from the point to a camera. For the offset pixel x outside a background or an image boundary, a depth value $d_I(x)$ is set to a larger constant that significantly exceeds a range of the training object, for example, 10 m.

Figure 3:
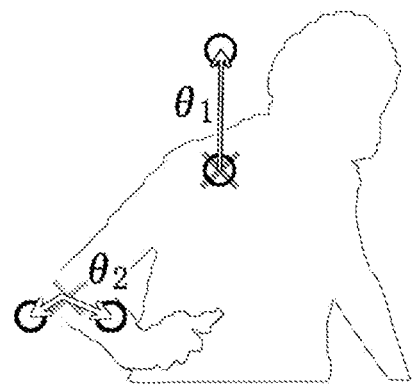
FIG. 3 is a schematic diagram of a depth-image feature at an image pixel position according to this application.
Figure 4:
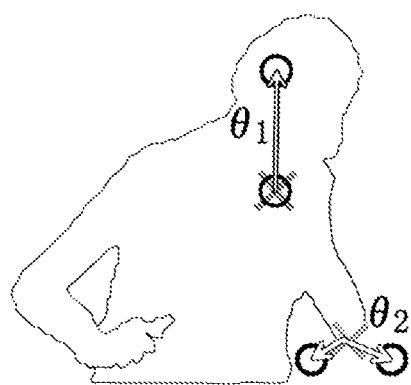
FIG. 4 is a schematic diagram of a depth-image feature at another image pixel position according to this application.

Referring to FIG. 3 and FIG. 4, two features of different pixel positions x are shown in FIG. 3 and FIG. 4. A features $f_{\theta_1}$ has a significant positive response to a pixel x close to a top portion of the body, but a response to a pixel at a lower position of the body is close to 0. A feature $f_{\theta_2}$ helps to discover a fine vertical structure, such as an arm. In FIG. 3 and FIG. 4, a cross represents the pixel x to be classified, and a circle represents an offset pixel defined by the foregoing equation (1). It can be learned from FIG. 3 that response values of two features shown in FIG. 3 are significantly different. It can be learned from FIG. 4 that at new positions, the response values of the same two features may significantly decrease. Any single feature can only provide a weak signal about which component of the body does the pixel belong to. However, after being combined in the decision forest, the features can accurately distinguish all body components that are calibrated as trained. Computational efficiency is fully considered when designing these features: No preprocessing is required; as shown in equation (1), when calculating each feature, at most 3 image pixels are required to be read and 5 arithmetic operations are required to be performed (two additions, two multiplications, and one subtraction); and the feature calculation can be directly performed by using a GPU.

S4. Performing position estimation on the three-dimensional coordinate of the human-body key points by using a random decision forest.

In some embodiments, the random decision forest consists of a plurality of random decision trees. Each of random decision trees is obtained by being trained as the following steps: obtaining a group of random branch-node candidate values of the decision tree; dividing a sample set into a left subset and a right subset through the branch-node candidate value of the decision tree; and obtaining a maximum gain of the sample set, wherein when a depth of the decision tree does not reach a preset value through the maximum gain, recursion is continued in the left subset and the right subset until the depth of the decision tree reaches the preset value, to complete the training.

Figure 5:
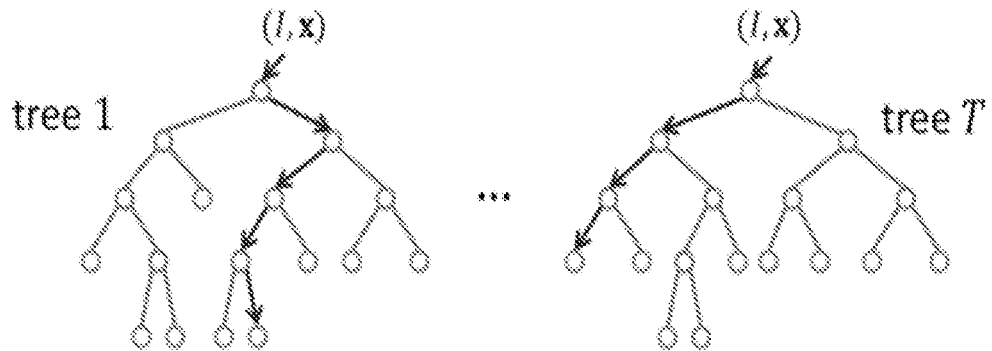
FIG. 5 is a schematic diagram of a random decision forest according to this application.

For many tasks, the random decision tree and the random decision forest have been proven to be fast and effective multi-class classifiers, and can be efficiently implemented on GPUs. As shown in FIG. 5, the decision forest is a collection of T decision trees. Each tree has branch nodes and leaf nodes. Each branch node is composed of a feature $f_\theta$ and a threshold $\tau$ (which is used to determine whether a feature value belongs to a left branch or a right branch). A quantity of leaf nodes of one decision tree determines a quantity of categories of features. In this application, the quantity of categories is equal to a quantity of to-be-classified body components plus 1 (background categories that do not belong to the body components). Average distribution values of all trees are calculated and are finally classified according to the following equation (2):

$$P(c|I, x) = \frac{1}{T}\sum_{t=1}^{T} P_t(c|I, x). \qquad (2)$$

In equation (2), input of the decision tree is a pixel x of an image I. In other words, a feature value of a pixel x is calculated to determine which body component or background category does the pixel x belong to. When classifying the pixel x of the image I, the feature value is continuously calculated from a root node, and then branching leftward or rightward is performed based on a comparison result between the feature value and a threshold. A leaf node of a tree T stores training distribution $P_t(c|I,x)$ of a body-component label c.

It can be learned from FIG. 5 that the random decision forest consists of a plurality of random decision trees, and each decision tree consists of branch nodes and leaf nodes. An arrow indicates that for certain input, different paths selected for different decision trees.

Further, each tree is trained on a different random synthetic sample library. 2000 sample pixels are randomly selected from each image to form random subsets that are roughly evenly distributed on various body components. Each tree is obtained through training, specifically as shown in equations (3) and (4):

$$Q_l(\varphi)=\{(I,x)|f_\theta(I,x)<\tau\} \qquad (3); \text{ and}$$

$$Q_r=Q\backslash Q_l(\varphi) \qquad (4)$$

$\varphi=(\theta,\tau)$ represents a random set of branch candidate values, where $\theta$ and $\tau$ respectively represent a feature parameter and a threshold. Each $\varphi$ is used to divide a sample set $Q=\{(I,x)\}$ into a left subset $Q_l$ and a right subset $Q_r$.

Further, this is determined by resolving a problem about a maximum information gain, specifically as shown in equations (5) and (6):

$$\varphi^* = \underset{\varphi}{\operatorname{argmax}}\ G(\varphi);\ \text{and} \qquad (5)$$

$$G(\varphi) = H(Q) - \sum_{s\in(l,r)} \frac{|Q_s(\varphi)|}{|Q|} H(Q_s(\varphi)). \qquad (6)$$

A Shannon entropy H(Q) is calculated on a regularized histogram of all body-component labels $l_i(x)$ a maximum gain $G(\varphi^*)$ is large enough but a depth of the tree does not reach a maximum value, recursion is continued in a left subset $Q_l(\varphi^*)$ and a right subset $Q_r(\varphi^*)$.

In some embodiments, the performing position estimation on the three-dimensional coordinate of the human-body key points by using the random decision forest includes: defining the body part of the training object by a plurality of different body labels, where the body labels include an estimation label which is used to directly estimate a three-dimensional coordinate of a particular human-body key point of the training object in the depth image and a filling label which is used to fill a blank area of the body of the training object in the depth image or predict a three-dimensional coordinate of human-body key points of another key points of the training object; extracting a depth-image feature from the depth image, and combining the depth-image feature with the random decision forest to distinguish between all body labels that are calibrated as trained; and performing position estimation on the three-dimensional coordinate of all the human-body key points of the training object in the depth image through the distinguished body labels.

Several local body parts densely covering the body are defined by different body labels. Some of these labels are used to directly estimate a position of a particular human-body key point, while the other labels are used to fill a blank space of the body or predict other key points through combinations. Different body parts are defined by several different body labels, so that it is converted that the localization of the human-body key point is performed by using an efficient classification algorithm, so as to resolve a problem.

In some embodiments, performing position estimation on the three-dimensional coordinate of the human-body key points by using the random decision forest further includes: obtaining a position estimation probability value of the three-dimensional coordinate of the human-body key points based on a probability density estimator of each of the body labels, and performing position estimation on the three-dimensional coordinate of the human-body key points based on the position estimation probability value; and obtaining a pixel weight based on the position estimation probability value, to obtain a three-dimensional coordinate of human-body key points corresponding to each of the body labels.

S5. Defining a body part of the training object as a corresponding body component, and calibrating a three-dimensional coordinate of all human-body key points corresponding to the body component.

To locate the human-body key point, a body part that is spatially close to the human-body key point that needs to be located is defined as a body component. The body component is described in texture mapping, and the texture mapping integrates various features during rendering. Data used for training the classifier is a matching combination of the depth information and an image of the body component. To distinguish between a left side and a right side of the body, a left body component and a right body component need to be distinguished. For example, a left arm and a right arm are different body components.

Through recognition of the body component, each pixel is classified into a corresponding body component category or a background category of the training object. After all pixels are classified into the corresponding body component category or the background category, a reliable prediction about a position of a three-dimensional human-body key point is formed.

It is relatively simple to directly accumulate known calibration depths to calculate a global three-dimensional position estimation for each body component. However, an irrelevant pixel may seriously reduce accuracy of this estimation method because in a practical application scenario, depths of body components are not completely consistent due to changes in a camera angle and in movements of a body builder. To ensure that the estimated feature has depth invariance, the probability density estimator of each body component is defined according to the following equation (7):

$$f_c(\hat{x}) \propto \sum_{i=1}^{N} w_{ic} \exp\left(-\left\|\frac{\hat{x}-\hat{x}_i}{h}\right\|^2\right). \qquad (7)$$

$\hat{x}$ represents a coordinate in three-dimensional world space, N represents a quantity of image pixels, $w_{ic}$ represents a pixel weight, $\hat{x}_i$ represents re-projection of an image pixel $x_i$ to a depth $d_I(x_i)$ of the world space, and $b_c$ represents a width of each body component during training.

The pixel weight is obtained based on the position estimation probability value according to the following equation (8):

$$w_{ic} = P(c|I,x_i) \cdot d_I(x_i)^2 \qquad (8).$$

$P(c|I,x_i)$ represents a probability density estimator integral for a certain region, where a corresponding probability value is calculated; $w_{ic}$ represents the pixel weight; and $d_I(x_i)$ represents the depth of the world space.

By using pixel weight $w_{ic}$, both a probability of which body component does the pixel belong to and a surface area of the pixel in the world space are considered, which ensures that density estimation has depth invariance and improves accuracy of predicting the human-body key point. According to different definitions of the body components, a probability $P(c|I,x_i)$ can be obtained through accumulation in a few component sets. For example, four body components covering a head can be fused to locate a head key point.

A mean offset is used to effectively recognize a pattern in probability density. All pixels higher than a learning probability threshold $\lambda_c$ are used as starting points of a body component c, and a sum of pixel weights in each pattern is used as a final confidence estimate. Because depth image feedback obtained by a depth camera is depth information about a surface of the body, that is, the detected pattern is located on the surface of the body, there is a certain deviation from an actual body key point. Therefore, a trained z-offset is used to restore each pattern to the surface of the body, so as to generate a final position prediction for the key point.

In some embodiments, before calibrating a three-dimensional coordinate of all human-body key points corresponding to the corresponding body component of the training object, the method further includes: determining a frame, in which no human-body key point is detected, as an invalid frame and discarding the invalid frame, when detecting the plurality of consecutive frames of depth images.

In some embodiments, before calibrating a three-dimensional coordinate of all human-body key points corresponding to the corresponding body component of the training object, the method further includes: discarding a frame in which not all human-body key points are calibrated and missed human-body key points exceed a set threshold, when detecting the plurality of consecutive frames of depth images; and confirming the missed human-body key point based on a relative position of the body component corresponding to the missed human-body key point in a previous frame of the frame to a neck of the training object when the missed human-body key points in the frame do not exceed the set threshold, and supplementing all missed human-body key points in the frame.

In this application, for a certain frame, if no human-body key point is detected, or if no neck or thigh is detected, the frame is considered invalid.

Further, due to occlusion and other factors, it is unable to locate all key points from a video frame, resulting in blank spaces at positions of these key points. To provide feature vectors with fixed sizes during feature classification, relatively accurate estimates need to be set for the positions of these key points. There are two bad situations: If this frame is abandoned, when the training object is not facing a camera, an occluded key point almost cannot be located through an algorithm; and these positions are set with unreasonable values. Theoretically, this is feasible when the classification algorithm is sufficiently robust, but in practical applications, accuracy of action recognition may be reduced. In this application, a method based on a position relative to the neck in the previous frame is used to assign values to these key points. For example, if a position of a right hand cannot be calibrated in a current frame, but in a previous frame, the right hand is located at a position of 0.4 m from a right side of the neck, in the current frame, the position of the right hand is set to be 0.4 m away from the neck.

S6. Extracting, based on the three-dimensional coordinate of all the human-body key points, a key-point position feature, a body moving speed feature, and a key-point moving speed feature for action recognition.

After processing on the three-dimensional coordinate of all the human-body key points is completed, positions of all the key points can be calibrated for subsequent action recognition. Key-point positions of N consecutive frames are taken as original features, and then more features for action recognition are extracted in combined with information of the N consecutive frames, such as the normalized key-point position feature, the body moving speed feature, and the key-point moving speed feature.

S7. Combining the key-point position feature, the body moving speed feature, and the key-point moving speed feature as a multidimensional feature vector, and performing dimensionality reduction on the multidimensional feature vector.

It should be noted that the key-point position feature, the body moving speed feature, and the key-point moving speed feature form a multidimensional vector. Under a premise of ensuring that main components of the feature vector remain basically unchanged, a PCA algorithm is used to reduce the multidimensional feature vector to a low-dimensional space for feature classification.

S8. Classifying the multidimensional feature vector that is performed with dimensionality reduction to recognize a fitness action of the training object, optimizing the initial model parameter based on the recognized fitness action, and completing training until a model conversion condition is reached to obtain a target fitness action recognition model.

In some embodiments, schemes for classifying the multidimensional feature vector that is performed with dimensionality reduction include a K-nearest neighbor algorithm, a support vector machine, a depth neural network, and a random forest.

For example, an appropriate classification scheme is applied to classify the foregoing features and finally recognize an action type of a user. Feature classification schemes include the K-nearest neighbor algorithm, the support vector machine, the depth neural network, the random forest, and the like. Specifically, a core idea of the K-nearest neighbor algorithm is that for an unclassified sample, a category thereof is determined by votes of K classified samples that are nearest to the unclassified sample. The support vector machine is a class 2 classification model, and a basic model thereof is defined as a linear classifier with a largest interval in feature space. A learning strategy of the support vector machine is to maximize the interval, which can finally be converted into a solution to a convex quadratic programming problem. The depth neural network consists of an input layer, several hidden layers, and an output layer, where the layers are fully connected to each other. Output of a previous layer is used to calculate output of a next layer, which is forward propagation. A back propagation algorithm is used to obtain a gradient and update a neuron parameter. The random forest is an optimal embodiment of this application. Further, the decision tree is a basic unit of the random forest, and a plurality of decision trees are integrated through an idea of integrated learning to classify samples. Each decision tree is a classifier. For an input sample, N trees have N classification results. The random forest integrates all classification voting results, and specifies a category with the most votes as final output.

A quantity of decision trees in the random forest has a monotonic effect on accuracy of the model. In other words, a larger quantity of decision trees indicates a better effect of the model. However, with increase of the quantity of the decision trees, a marginal effect becomes more obvious. Computational complexity, memory required, and calculation time of the model increase linearly with the increase of the quantity of the decision trees. For different classification tasks, this parameter needs to directly achieve balance between training difficulty and a model effect. After experimental comparison and testing, 100 decision trees with a depth of 30 are used in this application. In this way, relatively high accuracy is possessed. The foregoing classification schemes can all be used for type recognition and classification of the fitness action, and an algorithm and a specific parameter can be selected based on an actual effect.

In some embodiments, the model training process is completed in this application through the following steps.

(1) Each training action uses depth image videos of single-person fitness actions with duration of 30 seconds, a resolution of 480 P, and a frame rate of 10 frames per second.

(2) To accurately recognize the fitness action of the training objects, 13 human-body key points are defined, that is, a neck, a right shoulder, a right elbow, a right hand, a left shoulder, a left elbow, a left hand, a right hip, a right knee, a right foot, a left hip, a left knee, and a left foot.

(3) A detection algorithm for the human-body key point in the depth image is used to locate the key point, and a random forest composed of three trees is selected, where each tree has a depth of 20 layers.

(4) If the detection algorithm for the human-body key point based on depth image in a certain frame does not detect all key points, the detected key point in the current frame is estimated by using a relative position between the key point and the neck node in a previous frame.

(5) Five consecutive frames of key points are selected as the original features. On this basis, more features, such as a movement trajectory of the key point and a motion trend, are extracted for action recognition.

(6) Position features of five consecutive frames of key points are calculated: Specifically, a dimension of feature space=13 (a quantity of key points)*3 (three-dimensional spatial coordinates of each key point)*5 (five consecutive frames)=195.

(7) An average bone height, that is, a length from neck to thigh, is calculated for five consecutive frames, to normalize the key-point position feature, where a dimension=1.

(8) A moving speed of the body (taking the neck as reference) is calculated, where a dimension=4.

(9) The normalized key-point position feature is calculated, and a dimension is consistent with that of the position of the foregoing key point, being 195.

(10) A moving speed of the normalized key point is calculated, where a dimension=13*3*4=156.

(11) Dimensions of all the foregoing features=195+1+4+195+156=551, and the PCA algorithm is used for dimensionality reduction. A dimension of the new feature vector is 50.

(12) An SVM feature classifier is trained to classify the new feature vector.

(13) The model training process includes several rounds of training, and the foregoing model training process is performed in each round of training until a training termination condition is reached, thereby completing the model training.

In some embodiments, a model inference process in the model training process is completed in this application through the following steps.

(1) A fitness process of the training object is collected by using a depth image sensor in a real-time manner. Video resolution of the video is 480 P, and a frame rate is 10 frames per second. Duration is not required, provided that a complete fitness process of the training object is included.

(2) The human-body key point is recognized in a depth image frame.

(3) Feature extraction and dimensionality reduction of the feature are performed.

(4) Steps of the foregoing model training process and the SVM feature classifier that has been trained are used to predict human-body actions in every 5 frames of the image.

It should be noted that in the foregoing process, methods such as a PCA dimensionality reduction algorithm and the SVM feature classifier can be replaced with other methods, which are merely feature methods listed for describing the embodiments herein.

Figure 6:
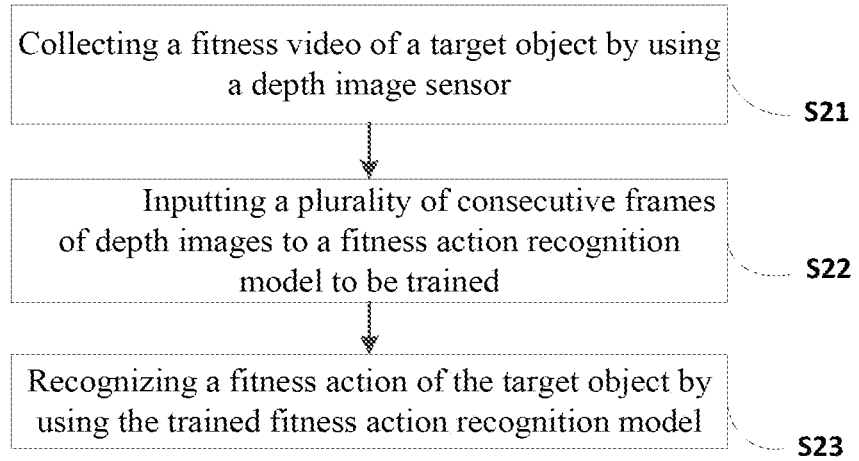
FIG. 6 is a schematic flowchart of a method of recognizing a fitness action according to this application.

Referring to FIG. 6, an embodiment of this application further provides a method of recognizing fitness action, including: S21. collecting a fitness video of a target object by using a depth image sensor; S22. transferring the collected fitness video into a trained fitness action recognition model by being trained using the foregoing training method; and S23. recognizing a fitness action of the target object by using the trained fitness action recognition model.

In this application, a fitness process of the training object is collected by using a depth camera, an image feature is extracted by using a three-dimensional image as input, and a feature classifier is designed to recognize the fitness action. According to the fitness action recognition model provided in this application, accuracy of calibrating the human-body key point is improved, and meanwhile, a risk of personal privacy leakage for a trainer is eliminated. At the same time, in this application, a three-dimensional depth image sensor is used to collect the depth information, but two-dimensional color image information is not collected. In this way, personal privacy of the user is protected, the risk of personal privacy leakage of the training object is eliminated, and images of three-dimensional spatial information are included. Therefore, the calibration of the key point of the training object and evaluation of a capability value of the training object are more accurate.

It should be noted that the method of recognizing fitness action provided in this application is implemented based on a user device. The user device can be a large-screen terminal mounted indoors or outdoors. Further, this application is implemented based on a depth camera. Theoretically, any terminal equipped with a depth camera can serve as the terminal of this application.

The terms "a plurality of embodiments", "some embodiments", "one embodiment", or "embodiment" mentioned throughout this specification mean that a component or a feature described in combination with the embodiments is included in at least one embodiment. Therefore, the phrases such as "in a plurality of embodiments", "in some embodiments", "in at least one another embodiment", or "in an embodiment" that appear throughout this specification may not necessarily refer to same embodiments. In addition, in one or more embodiments, specific features, components, or features can be combined in any suitable manner. Therefore, without limitation, specific features, components, or features illustrated or described in combination with one embodiment can be entirely or partially combined with features, components, or features of one or more other embodiments. Such modifications and variations all fall within the scope of this application.

For similar parts between the embodiments provided in this application, reference can be made to each other. The specific implementations described above are merely some examples under a general concept of this application, and do not constitute any limitation to the protection scope of this application. For a person skilled in the art, any other implementations derived according to the solutions of this application without an effective effort all fall within the protection scope of this application.

Merely preferred implementations of this application are described above. It should be noted that for persons of ordinary skills in the art, improvements and modifications can be made without departing from the principles of this application, and these improvements and modifications should also be considered as being subject to the protection scope of this application.

What is claimed is:

1. A fitness action recognition model, comprising an information extraction layer, a pixel point positioning layer, a feature extraction layer, a vector dimensionality reduction layer, and a feature vector classification layer, wherein
   the information extraction layer is configured to obtain image information of a training object in a depth image, the image information comprising a three-dimensional coordinate of human-body key points corresponding to all pixel points in the depth image;
   the pixel point positioning layer is configured to perform position estimation on the three-dimensional coordinate of the human-body key points by using a random decision forest, define a body part of the training object as a corresponding body component, and calibrate the three-dimensional coordinate of all human-body key points corresponding to the body component;
   the feature extraction layer is configured to extract, based on the three-dimensional coordinate of all the human-body key points, a key-point position feature, a body moving speed feature, and a key-point moving speed feature for action recognition;
   the vector dimensionality reduction layer is configured to combine the key-point position feature, the body moving speed feature, and the key-point moving speed feature as a multidimensional feature vector, and perform dimensionality reduction on the multidimensional feature vector; and
   the feature vector classification layer is configured to classify the multidimensional feature vector that is performed with dimensionality reduction, to recognize a fitness action of the training object.

2. A method of training a fitness action recognition model, applicable to the model according to claim 1, comprising:
   collecting a motion process video of a training object by using a three-dimensional visual sensor, and extracting a plurality of consecutive frames of depth images that contain the training object based on the motion process video; and
   inputting the plurality of consecutive frames of depth images to a fitness action recognition model to be trained,
   wherein the fitness action recognition model to be trained performs the following steps based on an initial model parameter:
   obtaining image information of the training object in the depth image, the image information comprising a three-dimensional coordinate of human-body key points corresponding to all pixel points in the depth image;
   performing position estimation on the three-dimensional coordinate of the human-body key points by using a random decision forest;
   defining a body part of the training object as a corresponding body component, and calibrating a three-dimensional coordinate of all human-body key points corresponding to the body component;
   extracting, based on the three-dimensional coordinate of all the human-body key points, a key-point position feature, a body moving speed feature, and a key-point moving speed feature for action recognition;
   combining the key-point position feature, the body moving speed feature, and the key-point moving speed feature as a multidimensional feature vector, and performing dimensionality reduction on the multidimensional feature vector; and
   classifying the multidimensional feature vector that is performed with dimensionality reduction to recognize a fitness action of the training object, optimizing the initial model parameter based on the recognized fitness action, and completing training until a model conversion condition is reached to obtain a target fitness action recognition model.

3. The method according to claim 2, wherein the performing position estimation on the three-dimensional coordinate of the human-body key points by using a random decision forest comprises:
   defining the body part of the training object by a plurality of different body labels, wherein the body labels comprise an estimation label which is used to directly estimate a three-dimensional coordinate of a particular human-body key point of the training object in the depth image and a filling label which is used to fill a blank area of the body of the training object in the depth image or predict a three-dimensional coordinate of human-body key points of another key point of the training object;
   extracting a depth-image feature from the depth image, and combining the depth-image feature with the random decision forest to distinguish between all body labels that are calibrated as trained; and
   performing position estimation on the three-dimensional coordinate of all the human-body key points of the training object in the depth image through the distinguished body labels.

4. The method according to claim 3, wherein the performing position estimation on the three-dimensional coordinate of the human-body key points by using a random decision forest further comprises:
   obtaining a position estimation probability value of the three-dimensional coordinate of the human-body key points based on a probability density estimator of each of the body labels, and performing position estimation on the three-dimensional coordinate of the human-body key points based on the position estimation probability value; and
   obtaining a pixel weight based on the position estimation probability value, to obtain a three-dimensional coordinate of human-body key points corresponding to each of the body labels.

5. The method according to claim 3, wherein the random decision forest includes a plurality of random decision trees, and each of the random decision trees is obtained by being trained as the following steps:
   obtaining a group of random branch-node candidate values of the decision tree;
   dividing a sample set into a left subset and a right subset through the branch-node candidate value of the decision tree; and
   obtaining a maximum gain of the sample set, wherein when a depth of the decision tree does not reach a preset value through the maximum gain, recursion is continued in the left subset and the right subset until the depth of the decision tree reaches the preset value, to complete the training.

6. The method according to claim 2, wherein before calibrating a three-dimensional coordinate of all human-body key points corresponding to the corresponding body components of the training object, the method further comprises:
   determining a frame, in which no human-body key point is detected, as an invalid frame and discarding the invalid frame, when detecting the plurality of consecutive frames of depth images.

7. The method according to claim 2, wherein before calibrating a three-dimensional coordinate of all human-body key points corresponding to the corresponding body component of the training object, the method further comprises:
   discarding a frame in which not all human-body key points are calibrated and missed human-body key points exceed a set threshold, when detecting the plurality of consecutive frames of depth images; and
   confirming the missed human-body key point based on a relative position of the body component corresponding to the missed human-body key point in a previous frame of the frame to a neck of the training object when the missed human-body key points in the frame do not exceed the set threshold, and supplementing all missed human-body key points in the frame.

8. The method according to claim 2, wherein schemes for the classifying the multidimensional feature vector that is performed with dimensionality reduction comprise a K-nearest neighbor algorithm, a support vector machine, a depth neural network, and a random forest.

9. A method of recognizing fitness action, comprising:
   collecting a fitness video of a target object by using a depth image sensor;
   transferring the collected fitness video into a trained fitness action recognition model obtained by being trained using the training method according to any one of claim 2; and
   recognizing a fitness action of the target object by using the trained fitness action recognition model.

* * * * *